Patented Aug. 18, 1942

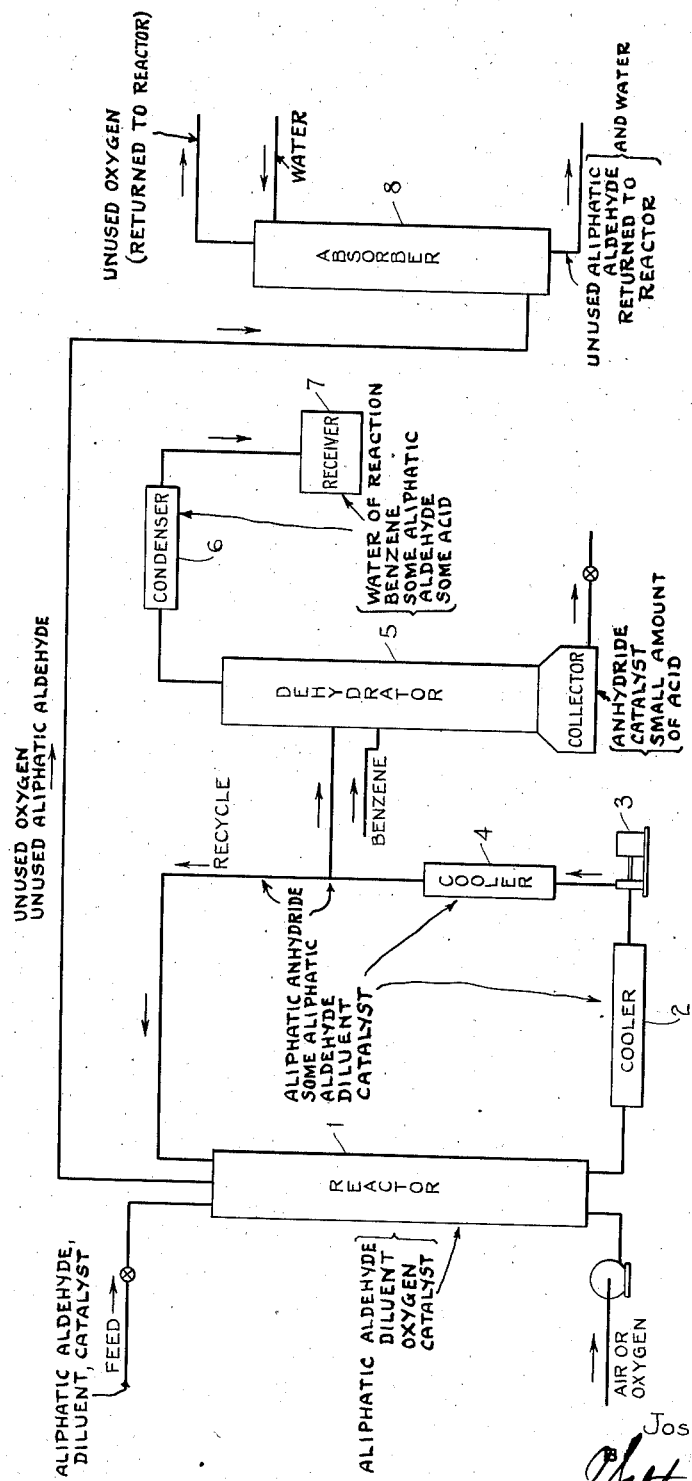

2,293,104

UNITED STATES PATENT OFFICE 2,293,104

OXIDATION OF ALDEHYDE

Joseph E. Bludworth, Cumberland, Md., assignor to Celanese Corporation of America, a corporation of Delaware Application December 27, 1939, Serial No. 311,072

14 Claims. (Cl. 260—546)

This invention relates to the direct oxidation of aldehydes to the corresponding acid anhydrides.

An object of this invention is the production of aliphatic acid anhydrides by the direct oxidation of aliphatic aldehydes in the liquid phase at atmospheric pressure and to produce the anhydrides in high yield with a minimum production of by-products such as the acid itself and the per acids.

A further object of this invention is to carry out the oxidation of aliphatic aldehydes to the corresponding anhydrides in the presence of a catalyst to obtain higher yields. Another object of the invention is the use of catalysts which can be reused without any further treatment or revivification.

While the manufacture of acetic acid anhydride by the catalytic oxidation of acetaldehyde has been suggested, it has not proven commercially practical because of the hydrolysis of the acetic acid anhydride and the resultant inconsequential and inconsistent yields. In the present process the known difficulties have been obviated and uniform, commercially practicable yields of acid anhydrides have been obtained by the direct oxidation in the liquid phase of the corresponding aldehydes.

This novel process for the production of aliphatic acid anhydrides broadly comprises the oxidation of aliphatic aldehydes in the liquid phase in the presence of a diluent and the recycling of the reaction products through the reaction zone while removing a portion of the products of the reaction and separating the acid anhydride therefrom. The process is continuous and the reaction mixture is continuously recycled in comparatively large quantities.

Various catalysts have been found to be operative, such as, the acetates of cobalt, manganese, iron, nickel, mixtures of the acetates of manganese and cobalt and cobalt and copper giving the best results. It has also been found that the catalysts which have generally been used in the catalytic oxidation of aldehydes to acids, and especially those used in the oxidation of acetaldehyde to acetic acid, are unsuitable for the oxidation of aldehydes directly to the corresponding acid anhydride. It is apparent that these catalysts are not particularly suited for anhydride formation since they not only yield the acid as the main product but also yield by-products which catalyze the hydrolysis of any anhydride formed to the free acid. In the presence of such catalytic by-products the separation of the anhydride is difficult for even though small amounts of anhydride may be produced, they are immediately hydrolyzed to the acid.

The catalysts which have been found to produce large yields of anhydride are mixed catalysts composed of the acetates of cobalt and copper in varying proportions. The use of cobalt acetate alone or of copper acetate alone does not promote the oxidation reaction in as great a degree as does cobalt acetate containing a trace of copper or copper acetate containing cobalt acetate. While iron and nickel acetate as well as manganese acetate yield considerable amounts of anhydride when used as catalysts, the anhydride is contaminated with per acids. The disadvantage of having per acids present, as has been mentioned previously, is that these acids catalyze the hydrolysis of the anhydride. This rapid hydrolysis makes it very difficult to separate any anhydride from the reaction mixture. The mixtures of cobalt and copper acetate, however, do not produce "per" compounds to an extent great enough to hydrolyze the anhydrides formed so that the best yields of anhydride are obtained with these mixed catalysts.

It has been found that the concentration of catalyst may vary from about 0.5% to about 5% based upon the weight of aldehyde, exclusive of that included in the recycle, introduced into the reaction zone. However, for any particular catalyst there is an optimum concentration which gives the highest yield of anhydride and the lowest yield of by-products in the form of acids and per acids. Inasmuch as the recovery of catalyst for reuse involves expensive mechanical operations, it is essential that these optimum conditions be determined in order to keep this cost down.

When acetaldehyde is oxidized to acetic acid anhydride the optimum concentration of cobalt acetate-copper acetate catalyst is about 2.0% and at this concentration the highest yield of anhydride is obtained. Total conversion with a catalyst of this concentration is approximately as great as when a catalyst cencentration of 0.8% was used. The advantage of using the slightly higher catalyst concentration lies in the fact that conversion of acetaldehyde to peracetic acid is highest when the catalyst concentration is low, i. e., about 0.2%. The formation of peracetic acid declines with increasing catalyst concentration. As a result it is advantageous to employ a higher catalyst concentration and to thereby inhibit the formation of peracetic acid.

As has been indicated, the catalysts which are most advantageous for the oxidation of aldehydes to the corresponding acid anhydrides are mixtures of copper acetate and cobalt acetate. When acetaldehyde was oxidized to acetic anhydride it was found that a mixture of 2.0% copper acetate with 0.2% of cobalt acetate gave a 71.3% conversion of acetaldehyde to acetic acid anhydride. This is a decided improvement over any yields hitherto obtained. When a catalyst mixture composed of 2.0% cobalt acetate and 0.2% of copper acetate was used, the conversion of acetaldehyde to acetic acid anhydride was 64%. In various other tests it was determined that the copper-cobalt acetate catalyst using the higher copper concentrations will consistently give the unusual and unexpected conversions of acetaldehyde to acetic acid anhydride ranging from 65% to 75%. In contrast to the high yields obtained by using these particular concentrations, low yields of anhydride were obtained when the concentrations of both copper and cobalt acetates in the reaction mixture were low. When a catalyst mixture of 0.2% of cobalt acetate was used with 0.2% of copper acetate a conversion of only 40% was obtained, which clearly shows that the catalyst concentration is an important factor in the degree of conversion which is obtained.

When cobalt acetate is used as a catalytic agent together with copper acetate it may be used in the hydrated form as well as in the anhydrous form. Ordinarily, the hydrated acetate of cobalt $Co(C_2H_3O_2) \cdot 4H_2O$ may be used. The water of hydration is released when the catalyst is heated with anhydride and this adds some water to the reaction mixture. It is therefore preferable to use this salt in its anhydrous form and to thereby eliminate the necessity for removing this water of hydration at some subsequent stage in the reaction. The anhydrous salt is not quite as soluble in acid as the hydrated salt but it does become more soluble after it enters the reactor and comes in contact with the products of the oxidation reaction. But even though it is not entirely soluble there is no difficulty in carrying out the oxidation with the catalyst partially in suspension. The catalyst may be filtered out at the base of the dehydrator and placed back in the system for reuse. Since the cobalt acetate catalyst is carried in suspension there is no necessity for taking any steps to improve its solubility.

It has been found that it is unnecessary to revivify the used catalyst before reusing since not only is its activity unimpaired but it seems in fact to be improved by use. The cause of this increased activity is not known but it may be due to the fact that the metal acetates recovered from the reaction may contain loosely combined oxygen in the molecule. In the case of cobalt acetate the loosely combined oxygen may be present as cobalt oxy-acetate, cobaltous peracetate or cobaltic peracetate.

The temperature at which the oxidation takes place in the reactor may be varied and the reaction will proceed satisfactorily at temperatures ranging from 80° F. to 125° F. At the lower temperatures it has been found that hydrolysis of anhydride is somewhat inhibited, absorption of oxygen is increased and the aldehyde tends to remain in solution to a greater extent. At lower temperatures, however, oxidation does not occur as rapidly as it does at higher temperatures. While the total conversion of acetaldehyde to various oxidation products is not as great at the lower temperatures as it is at higher temperatures, the percentage of the total conversion which goes to anhydride is approximately as great at the lower temperatures as it is at higher temperatures.

Various diluents are suitable in the liquid phase oxidation of aldehydes to anhydrides. Among the various diluents which are suitable are acetic acid or the acid corresponding to the aldehyde being oxidized, triacetin, ethyl acetate and benzene. Such other inert and miscible diluents as the chlorinated hydrocarbons, viz. carbon tetrachloride and chlorbenzene are also suitable. Acetic acid when used as a diluent produced by far the greatest yield of anhydride in the oxidation of acetaldehyde and also the greatest total conversion. While appreciable amounts of anhydride are recovered when using any of the diluents, the recovery is most satisfactory with acetic acid as diluent in the oxidation of acetaldehyde.

The recycling of a substantial portion of the reaction mixture through the reaction zone during the course of the reaction is an essential feature of this process. The recycling of the reactants through the reaction zone serves two functions. First, it is a means of presenting the greatest unit volume of aldehyde to each unit volume of oxygen, and, second, it serves as a means for removing the heat of reaction, thereby affording an excellent means for controlling the temperature of the reaction zone. While some conversion to anhydride is obtained when there is no recycle, a definite and substantial increase in the yield of anhydride is observed when large amounts of the reaction mixture are recycled. This reaction mixture includes the anhydride formed, the acetic acid by-product and the catalyst, as well as unconverted aldehyde. The recycle ratio may vary, for example, from about 60 to 1 to about 90 to 1 with recycle ratios of about 80 to 1 having been found most suitable. Since the temperature of the reaction zone is a function of the recycle ratio the rate may be varied so that the reaction may be carried out at any desired temperature. The recycle ratio is the total volume of liquid from the reactor recycled per minute compared with the volume of fresh aldehyde fed to the process during the same time interval. The process is illustrated by the accompanying diagrammatic drawing and by the following examples but these examples are given merely by way of illustration and are not to be considered limitative.

*Example I*

A mixture composed of 2.09 parts by weight of acetaldehyde and 2.82 parts of acetic acid in which are suspended 0.055 part of copper acetate and 0.005 part of cobalt acetate is continuously introduced into the top of reactor 1 each minute together with 1.0 part of acetaldehyde recovered from receiver 7 and absorber 8. The reactor is a column packed with glass. Oxygen is forced in at the base of the reactor at the rate of 1.312 parts by weight per minute and the liquid mixture to be oxidized gravitates downward countercurrent to the rising stream of oxygen. The effluent unused oxygen leaves the top of the reactor and goes to the absorber 8 where the oxygen is scrubbed by 3.8 parts of water per minute. 0.482 part per minute of unused oxygen leave at the top of the absorber and 0.38 part per minute of acetaldehyde are removed in the scrub water for return to the reactor. The reacting liquids flow to the base of the reactor where they are cooled by a cooler 2 and then pumped by a pump 3 through a second cooler 4 from which a portion is fed back to the top of the reactor and a part is taken off continuously and delivered to a dehydrating column 5. The portion taken to the dehydrator per minute consists of approximately 0.93 part of acetic acid anhydride, 0.38 part of water, 3.26 parts of acetic acid, 0.62 part of acetaldehyde, 0.055 part of copper acetate and 0.005 part of cobalt acetate.

Benzene is fed continuously to the dehydrating column 5 in the amount of 13.17 parts per minute. Some acid, aldehyde and all the water and benzene are removed overhead from the dehydrator by the way of a condenser 6 and passed into a receiver 7. The anhydride, catalyst and some acid are removed at the base of the dehydrator.

The temperature in the reactor is held to 110° F. and is controlled by regulating the flow of recycle by means of the pump. The recycle per minute consists of approximately 37.3 parts of acetic anhydride, 130.3 parts of acetic acid, 15.2 parts of water, 24.8 parts of acetaldehyde, 2.2 parts of copper acetate and 0.2 part of cobalt acetate. This is a recycle rate of about 82 to 1 since there are approximately 220 parts of liquid by volume recycled per minute compared to a feed of 2.6 parts by volume of acetaldehyde per minute.

The benzene taken off in the receiver and the amount of catalyst removed per minute at the base of the dehydrator are equal to the amounts fed in per minute and no excess is allowed to build up in the process.

Example II

A mixture composed of 2.09 parts by weight of acetaldehyde and 2.82 parts of acetic acid in which are suspended .005 part of copper acetate and 0.055 part of cobalt acetate is continuously introduced into the top of reactor 1 each minute together with 0.73 part of acetaldehyde recovered from receiver 7 and absorber 8. The reactor is a column packed with glass. Oxygen is forced in at the base of the reactor at the rate of 1.216 parts by weight per minute and the liquid mixture to be oxidized gravitates downward counter-current to the rising stream of oxygen. The effluent unused oxygen leaves the top of the reactor and goes to the absorber 8 where the oxygen is scrubbed by 1.5 parts of water per minute. 0.2025 part per minute of unused oxygen leave at the top of the absorber and 0.15 part per minute of acetaldehyde are removed in the scrub water for return to the reactor. The reacting liquids flow to the base of the reactor where they are cooled as indicated in Example I. The portion taken to the dehydrator per minute consists of approximately 1.01 parts of acetic acid anhydride, 0.35 part of water, 3.49 parts of acetic acid, 0.58 part of acetaldehyde, 0.005 part of copper acetate and 0.055 part of cobalt acetate.

Benzene is fed continuously to the dehydrating column 5 in the amount of 13.17 parts per minute and dehydration carried out as described in Example I.

The temperature in the reactor is held to 120° F. and is controlled by regulating the flow of recycle by means of the pump. The recycle per minute consists of approximately 38.7 parts of acetic anhydride, 133.41 parts of acetic acid, 13.4 parts of water, 22.2 parts of acetaldehyde and 0.19 part of copper acetate and 2.10 parts of cobalt acetate. This is a recycle rate of about 80 to 1.

Example III

A mixture composed of 7.81 parts by weight of acetaldehyde and 9.96 parts of acetic acid in which are suspended 0.5 part of cobalt acetate is continuously introduced into the top of a reactor 1 each minute together with 3.46 parts of acetaldehyde recovered from receiver 7 and absorber 8. The reactor is a column packed with glass. Oxygen is forced in at the base of the reactor at the rate of 4.54 parts by weight per minute and the liquid mixture to be oxidized gravitates downward counter-current to the rising stream of oxygen. The effluent unused oxygen leaves the top of the reactor and goes to the absorber 8 where the oxygen is scrubbed by 7.5 parts of water per minute. .00526 part per minute of unused oxygen leaves at the top of the absorber and .586 part per minute of acetaldehyde is removed in the scrub water for return to the reactor. The reacting liquids flow to the base of the reactor where they are cooled by a cooler 2 and then pumped by a pump 3 through a second cooler 4 from which a portion is fed back to the top of the reactor and a part is taken off continuously and delivered to a dehydrating column 5. The portion taken to the dehydrator per minute consists of approximately 2.92 parts of acetic acid anhydride, 0.51 part of water, 12.48 parts of acetic acid, 2.87 parts of acetaldehyde and 0.5 part of cobalt acetate.

Benzene is fed continuously to the dehydrating column 5 in the amount of 16.33 parts per minute. Some acid, aldehyde and all the water and benzene are removed overhead from the dehydrator by way of a condenser 6 and passed into a receiver 7. The anhydride, catalyst and some acid are removed at the base of the dehydrator. The temperature in the reactor is held to 120° F. and is controlled by regulating the flow of recycle by means of the pump. The recycle per minute consists of approximately 121.7 parts by weight of acetic anhydride, 519.2 parts of acetic acid, 20.7 parts of water, 118.3 parts of acetaldehyde and 20.7 parts of cobalt acetate. This is a recycle rate of 80 to 1 since there are approximately 800 parts of liquid by volume recycled per minute compared to a feed of 10 parts by volume of acetaldehyde per minute.

The benzene taken off in the receiver and the cobalt acetate catalyst removed per minute at the base of the dehydrator are equal to the amounts fed in per minute and no excess is allowed to build up in the process.

While the above examples set forth preferred modes of practicing the invention, it is to be understood that the details given above may be modified in many respects without departing from the spirit and scope of the invention. Thus while the process has been described particularly with reference to the conversion of acetaldehyde to acetic anhydride, it is also applicable to other aliphatic aldehydes such as propionaldehyde, butyraldehyde, valeric aldehyde and caproic aldehyde.

The oxygen necessary for the oxidation may be introduced as pure oxygen but air is preferably employed. When air is employed for the oxidation it is preferable to carry out the reaction at pressure above atmospheric so that the concentration of oxygen in the reaction zone will be equivalent to that obtained when pure oxygen gas is used.

Having described my invention, what I desire to secure by Letters Patent is:

1. In a continuous process for a manufacture of an aliphatic anhydride by oxidation of the corresponding aldehyde in the liquid phase and in the presence of a catalyst selected from the group consisting of the acetates of cobalt, manganese, iron, nickel and copper and mixtures thereof, the steps of maintaining substantially constant the composition of the reaction liquor, circulating reaction liquor between reaction zone and a cooler while separating part of said liquor for the recovery of anhydride therefrom, and re-introducing into the reaction zone by said circulation a quantity of reaction liquor equal to from 60 to 90 times the volume in the liquid state of fresh aldehyde introduced into the system to replace that undergoing oxidation.

2. In a continuous process for the manufacture of an aliphatic anhydride by oxidation of the corresponding aldehyde in the liquid phase and in the presence of a catalyst selected from the group consisting of the acetates of cobalt, manganese, iron, nickel and copper and mixtures thereof, the steps of maintaining substantially constant the composition of the reaction liquor, circulating reaction liquor between reaction zone and a cooler while separating part of said liquor for the recovery of anhydride therefrom, and re-introducing into the reaction zone by said circulation a quantity of reaction liquor equal to about 80 times the volume in the liquid state of fresh aldehyde introduced into the system to replace that undergoing oxidation.

3. In a continuous process for the manufacture of acetic anhydride by oxidation of acetaldehyde in the liquid phase and in the presence of a catalyst selected from the group consisting of the acetates of cobalt, manganese, iron, nickel and copper and mixtures thereof, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

4. In a continuous process for the manufacture of acetic anhydride by oxidation of acetaldehyde in the liquid phase and in the presence of a catalyst selected from the group consisting of the acetates of cobalt, manganese, iron, nickel and copper and mixtures thereof, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldeyhde introduced into the system to replace that undergoing oxidation.

5. In a continuous process for the manufacture of acetic anhydride by oxidizing acetaldehyde in the liquid phase with oxygen and in the presence of a catalyst selected from the group consisting of the acetates of cobalt, manganese, iron, nickel, and copper and mixtures thereof, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

6. In a continuous process for the manufacture of acetic anhydride by oxidizing acetaldehyde in the liquid phase with oxygen and in the presence of a catalyst selected from the group consisting of the acetates of cobalt, manganese, iron, nickel, and copper and mixtures thereof, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldehyde introduced into the system to replace that undergoing oxidation.

7. In a continuous process for the manufacture of acetic anhydride by oxidizing acetaldehyde in the liquid phase with oxygen and in the presence of a catalyst comprising a mixture consisting of the acetates of cobalt and copper, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

8. In a continuous process for the manufacture of acetic anhydride by oxidizing acetaldehyde in the liquid phase with oxygen and in the presence of a catalyst comprising a mixture consisting of the acetates of cobalt and copper, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldehyde introduced into the system to replace that undergoing oxidation.

9. In a continuous process for the manufacture of acetic anhydride by oxidizing acetaldehyde in the liquid phase with oxygen and in the presence of a catalyst comprising a mixture consisting of the acetates of cobalt and manganese, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

10. In a continuous process for the manufacture of acetic anhydride by oxidizing acetaldehyde in the liquid phase with oxygen and in the presence of a catalyst comprising a mixture consisting of the acetates of cobalt and manganese, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldehyde introduced into the system to replace that undergoing oxidation.

11. In a continuous process for the manufacture of acetic anhydride by oxidizing acetaldehyde in the liquid phase with oxygen and in the presence of a catalyst comprising a mixture consisting of the acetates of cobalt and copper in an amount equal to from 0.5 to 5% based on the weight of the acetaldehyde, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

12. In a continuous process for the manufacture of acetic anhydride by oxidizing acetaldehyde in the liquid phase with oxygen and in the presence of a catalyst comprising a mixture consisting of the acetates of cobalt and copper in an amount equal to from 0.5 to 5% based on the weight of the acetaldehyde, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldehyde introduced into the system to replace that undergoing oxidation.

13. In a continuous process for the manufacture of acetic anhydride by oxidizing acetaldehyde in the liquid phase with oxygen and in the presence of a catalyst comprising a mixture consisting of the acetates of cobalt and copper in an amount equal to about 2% based on the weight of the acetaldehyde, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to from 60 to 90 times the volume in the liquid state of fresh acetaldehyde introduced into the system to replace that undergoing oxidation.

14. In a continuous process for the manufacture of acetic anhydride by oxidizing acetaldehyde in the liquid phase with oxygen and in the presence of a catalyst comprising a mixture consisting of the acetates of cobalt and copper in an amount equal to about 2% based on the weight of the acetaldehyde, the steps of maintaining substantially constant the composition of the reaction liquor comprising acetaldehyde and acetic acid as diluent, circulating reaction liquor between the reaction zone and a cooler while separating part of said liquor for the recovery of acetic anhydride therefrom, and re-introducing into the reaction zone by said circulation a quantity of reaction liquor equal to about 80 times the volume in the liquid state of fresh acetaldehyde introduced into the system to replace that undergoing oxidation.

JOSEPH E. BLUDWORTH.